(12) United States Patent
Tsukagoshi et al.

(10) Patent No.: US 7,876,664 B2
(45) Date of Patent: Jan. 25, 2011

(54) OPTICAL RECORDING MEDIUM

(75) Inventors: Takuya Tsukagoshi, Sagamihara (JP); Koji Mishima, Tokyo (JP); Daisuke Yoshitoku, Tokyo (JP)

(73) Assignee: TDK Corporation, Tokyo (JP)

( * ) Notice: Subject to any disclaimer, the term of this patent is extended or adjusted under 35 U.S.C. 154(b) by 989 days.

(21) Appl. No.: 11/204,104

(22) Filed: Aug. 16, 2005

(65) Prior Publication Data

US 2006/0062133 A1    Mar. 23, 2006

(30) Foreign Application Priority Data

Aug. 31, 2004    (JP) .............................. 2004-252731

(51) Int. Cl.
    G11B 7/24    (2006.01)
(52) U.S. Cl. .................................... 369/275.1
(58) Field of Classification Search ............... 369/275.1
    See application file for complete search history.

(56) References Cited

U.S. PATENT DOCUMENTS

| | | | |
|---|---|---|---|
| 3,706,485 A * | 12/1972 | Fawcett et al. ............... | 359/588 |
| 5,414,451 A | 5/1995 | Sugiyama et al. | |
| 5,555,537 A * | 9/1996 | Imaino et al. .................. | 369/94 |
| 5,586,107 A * | 12/1996 | Best et al. ................. | 369/275.1 |
| 5,608,715 A * | 3/1997 | Yokogawa et al. ........ | 369/275.1 |
| 5,841,753 A | 11/1998 | Holtslag et al. | |
| 6,026,069 A | 2/2000 | Holtslag et al. | |

2004/0139459 A1    7/2004    Mishima et al.

FOREIGN PATENT DOCUMENTS

| | | |
|---|---|---|
| CN | 1090668 A | 8/1994 |
| EP | 0 605 924 A2 | 7/1994 |
| JP | A-05-006546 | 1/1993 |
| JP | A 2001-155380 | 6/2001 |
| JP | A 2004-213720 | 7/2004 |
| WO | WO 96/06427 | 2/1996 |
| WO | WO 96/28818 | 9/1996 |
| WO | WO 2004/114289 A1 | 12/2004 |
| WO | WO 2005/104115 A1 | 11/2005 |

OTHER PUBLICATIONS

Hideki Kitaura et al. "Multi-layer Write-once Media with Te-O-Pd Films utilizing a Violet Laser," Optical Data Storage 2001, Terril Hurst, Seiji Kabayashi, Editors, Proceedings of SPIE vol. 4342 (2002) © 2002 SPIE, pp. 340-347.

* cited by examiner

*Primary Examiner*—Thang V Tran
*Assistant Examiner*—Carl Adams
(74) *Attorney, Agent, or Firm*—Oliff & Berridge, PLC

(57) ABSTRACT

An optical recording medium including three or more recording layers is provided. The optical recording medium includes an L0 layer, an L1 layer, an L2 layer, and an L3 layer as the recording layers and first to third light transmitting spacer layers respectively arranged between the recording layers. A refractive index $n_3$ of the third light transmitting spacer layer is set to satisfy $n_3<n_1$ with respect to a refractive index $n_1$ of the first and second light transmitting spacer layers. Thus, an effect of crosstalk light during reproduction can be reduced.

1 Claim, 9 Drawing Sheets

Fig. 5
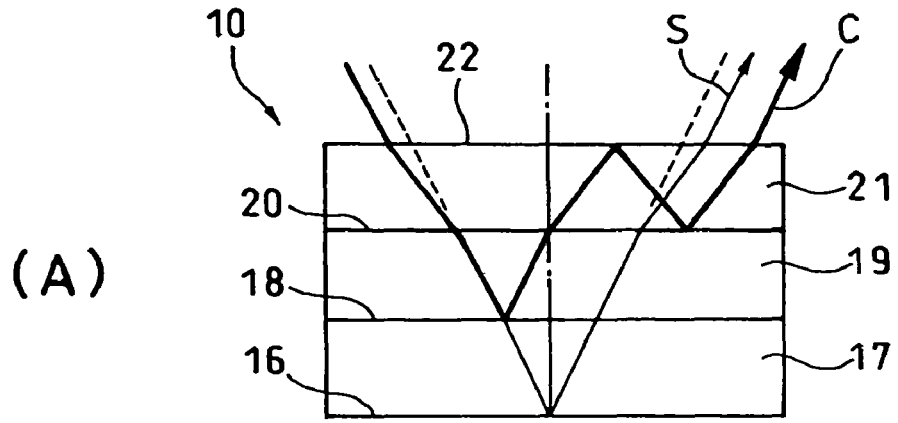
(A)
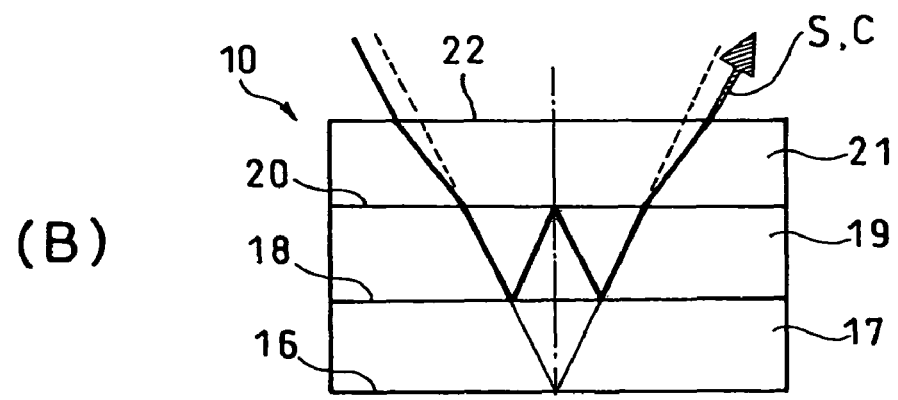
(B)
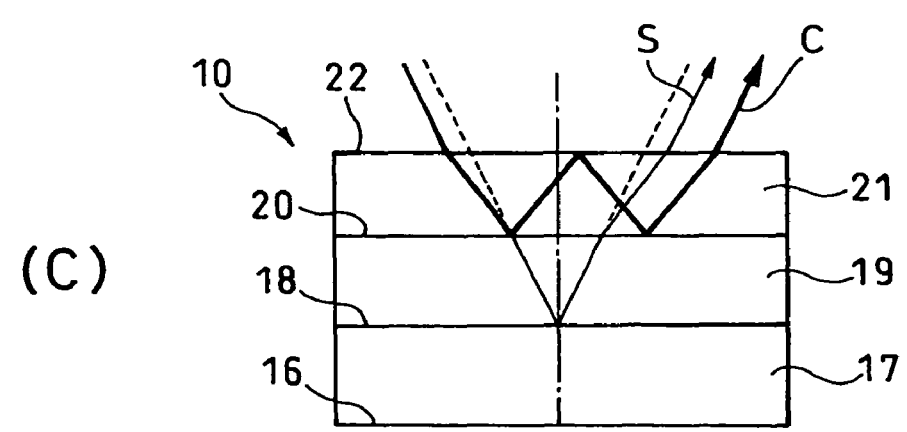
(C)

Fig. 11
PRIOR ART
(A)
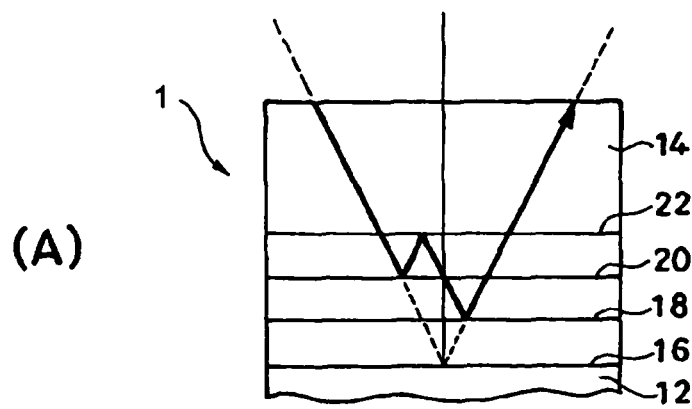
(B)
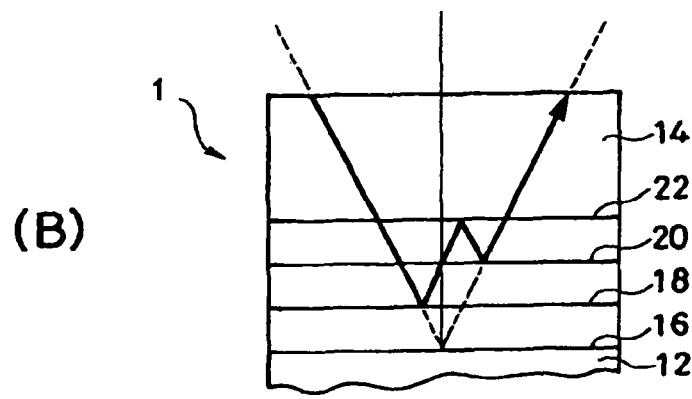
(C)
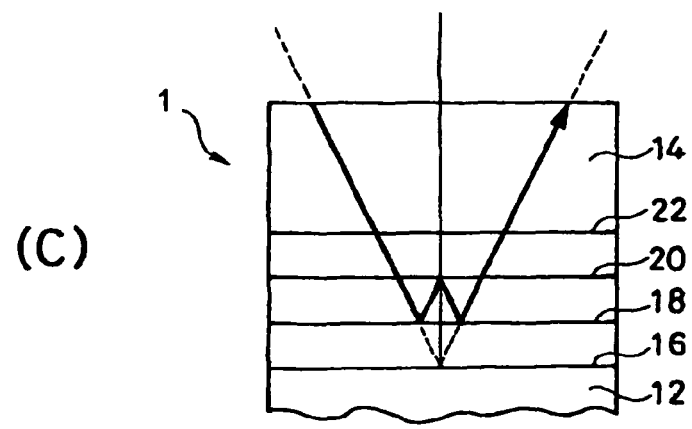

OPTICAL RECORDING MEDIUM

BACKGROUND OF THE INVENTION

1. Field of the Invention

The present invention relates to an optical recording medium. More particularly, the present invention relates to an optical recording medium including three or more recording layers.

2. Description of the Related Art

An optical recording medium such as CD (compact disc) or DVD (digital versatile disc) is widely used as a recording medium for storing digital data. As that optical recording medium, a multilayer optical recording medium is known that includes a plurality of information recording layers in order to increase storage capacity. The recording layers are stacked with light transmitting spacer layers interposed therebetween in the multilayer optical recording medium.

When a recording mark on one recording layer is reproduced in the aforementioned multilayer optical recording medium, a recording mark on another recording layer is not reproduced. However, if there is reflected light from the other recording layer and the amount of the reflected light or a distance between the recording layers is varied for some reason, the variation (hereinafter, crosstalk variation) may be superimposed as a noise on a reproduction signal.

In order to reduce an effect of interlayer crosstalk as described above, an optical recording medium is proposed in which distances between recording layers are intentionally made different, as described in Japanese Patent Laid-Open No. 2004-213720, for example.

SUMMARY OF THE INVENTION

In view of the foregoing problems, various exemplary embodiments of this invention provide an optical recording medium that can reduce interlayer crosstalk more efficiently based on a relationship between refractive indices of light transmitting spacer layers arranged between recording layers in the multilayer optical recording medium and crosstalk.

The inventor found as a result of studies that, when a total thickness of the light transmitting spacer layers was 5 µm or more, third-order crosstalk (described later) formed most interlayer crosstalk and almost all part of the third-order crosstalk was confocal crosstalk (described later). The inventor also found that an actual four-layer optical recording medium included light transmitting spacer layers having a total thickness of about 50 µm and almost all of an effect of the interlayer crosstalk was an effect of the confocal third-order crosstalk.

The "third-order crosstalk" and the "confocal crosstalk" will now be described.

As shown in FIG. 11A, an optical recording medium 1 is considered that includes four recording layers, i.e., an L0 layer 16, an L1 layer 18, an L2 layer 20, and an L3 layer 22 between a substrate 12 and a light transmitting cover layer 14, for example. When reproduction for the L0 layer 16 is performed, a component of reproduction light incident on the light transmitting cover layer 14, that is reflected only by the L0 layer 16 and exits to the outside of the optical recording medium 1, is used as signal light. Moreover, there are components that are reflected by any of the L1 layer 18, the L2 layer 20, and the L3 layer 22 only once and exit to the outside of the optical recording medium 1. Those components are so-called crosstalk light. Especially, those components are referred to as "first-order crosstalk (light)" in the present application in order to distinguish them from multiple reflection components described later. In addition, there are multiple reflection components that are reflected by the recording layers a number of times, because the recording layers respectively having finite refractive indices are formed in the multilayer recording medium.

The multiple reflection components that actually exit to the outside of the recording medium are light reflected by the recording layers an odd number of times only. The smallest number of reflections for that light is three. The light reflected three times is referred to as "third-order crosstalk (light)" in the present application.

FIG. 11A shows an example of the third-order crosstalk that is reflected by the L2 layer, the L3 layer, and the L1 layer in that order. Although there are other multiple reflection components reflected five or more times, they can be ignored because the intensity of the multiple reflection component is lowered as the number of reflections increases. In FIG. 11A, a light path of the signal light is shown with broken line and the third-order crosstalk light is shown with bold line. As shown in FIG. 11A, the third-order crosstalk light travels on the same light path as that of the signal light, when exiting from the optical recording medium. In general, the first-order crosstalk light and third-order crosstalk light exit from the optical recording medium, while traveling on different light paths from that of the signal light. However, in the case where the intervals between the recording layers satisfy a special relationship, there is crosstalk light that exits from the optical recording medium while traveling on the same light path as that of the signal light. Such crosstalk light is especially called as "confocal crosstalk (light)."

FIGS. 11A to 11C show a single light beam having a specific incident angle. However, there are actually a number of light beams in a certain range of incident angles. A point on which those light beams are focused is a focus. The confocal crosstalk light is focused on a point different from a point on which the signal light is focused inside the optical recording medium, but behaves almost like a diverging spherical wave emitted from the same focus as that of the signal light outside the optical recording medium.

The present invention achieves the above object by providing an optical recording medium that can reduce the confocal third-order crosstalk so as to effectively reduce total crosstalk.

Accordingly, various exemplary embodiments of the invention provide:

(1) An optical recording medium comprising a substrate; a light transmitting cover layer; at least three recording layers including an L0 layer, an L1 layer, and an L2 layer formed between the substrate and the light transmitting cover layer in that order from the substrate; and a plurality of light transmitting spacer layers respectively formed between the recording layers, wherein at least one of the light transmitting spacer layers has a refractive index different from that of another light transmitting spacer layer.

(2) The optical recording medium according to (1), wherein the recording layers include the L0 layer, the L1 layer, the L2 layer, and an L3 layer in that order from the substrate, and one of the light transmitting spacer layers that is arranged between the L1 layer and the L2 layer has a refractive index different from those of other light transmitting spacer layers.

(3) The optical recording medium according to (1) or (2), wherein three or more light transmitting spacer layers are provided, and at least three of the light transmitting spacer layers that are adjacent to each other via the recording layers interposed therebetween have refractive indices different from each other, and are arranged in such a manner that the refractive indices sequentially become larger.

(4) The optical recording medium according to any one of (1) to (3), wherein a refractive index difference between the light transmitting spacer layers is 0.006 or more and 0.025 or less.

According to the present invention, an optical recording medium is provided that includes: at least three recording layers including an L0 layer, an L1 layer, and an L2 layer formed between a substrate and a light transmitting cover layer in that order from the substrate; and light transmitting spacer layers respectively formed between the recording layers, wherein a refractive index of at least one of the light transmitting spacer layers is different from that of another light transmitting spacer layer. Due to this, the focal position of the third-order crosstalk light can be shifted from a light-receiving surface of a light-receiving device. Thus, an effect of interlayer crosstalk can be largely reduced.

BRIEF DESCRIPTION OF THE DRAWINGS

FIGS. 5A, 5B, and 5C are cross-sectional views schematically showing relationships between other crosstalk light and the signal light in the optical recording medium of the first exemplary embodiment;

FIGS. 11A, 11B, and 11C are cross-sectional views schematically showing states of confocal crosstalk light in a conventional four-layer optical recording medium.

DETAILED DESCRIPTION OF THE PREFERRED EMBODIMENTS

An optical recording medium includes recording layers, i.e., an L0 layer, an L1 layer, an L2 layer, and an L3 layer between a substrate and a light transmitting cover layer (hereinafter, simply referred to as a cover layer) in that order from the substrate, and further includes light transmitting spacer layers (hereinafter, simply referred to as spacer layers) respectively formed between the recording layers. Refractive indices of the spacer layers are set so as to sequentially become larger or smaller in a thickness direction.

Figure 1:
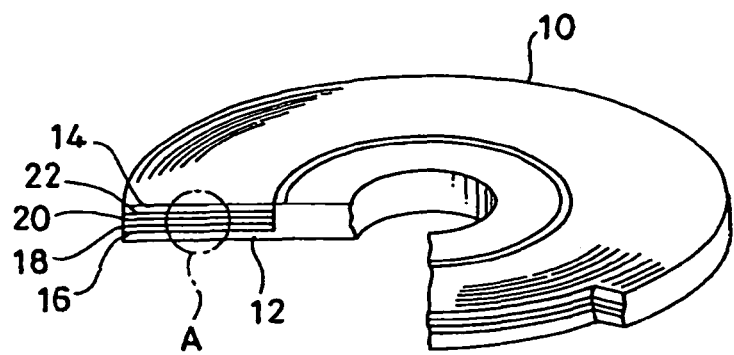
FIG. 1 is a perspective view of an optical recording medium according to a first exemplary embodiment of the present invention, which includes a partial cross-sectional view.

A first exemplary embodiment of the present invention shown in FIGS. 1 and 2 will be described hereinbelow.

An optical recording medium 10 of the first exemplary embodiment includes four recording layers, i.e., an L0 layer 16, an L1 layer 18, an L2 layer 20, and an L3 layer 22 and spacer layers 17, 19, and 21 respectively formed between the recording layers. The recording layers and the spacer layers are formed between a substrate 12 and a cover layer 14.

The spacer layer (hereinafter, a third spacer layer) 21 has a refractive index of $n_3$. The spacer layer (hereinafter, a second spacer layer) 19, the spacer layer (hereinafter, a first spacer layer) 17, and the cover layer 14 each have a refractive index of $n_1$ that is larger than $n_3$.

An operation mechanism of the optical recording medium 10 of the first exemplary embodiment for reducing the third-order confocal crosstalk is now described with reference to FIG. 2. FIG. 2 shows a light path of the confocal crosstalk light in case of reproducing the L0 layer 16 in the four-layer optical recording medium.

It is found that the total recording and reproduction characteristics of the optical recording medium 1 including the spacer layers having the same refractive index, as shown in FIGS. 11A, 11B, and 11C, can be improved by reducing three patterns of confocal crosstalk light, although the description is omitted. As shown in FIGS. 11A to 11C, the three patterns of confocal crosstalk light travel on the same light path as signal light that is reflected by the L0 layer 16 only once. Thus, the total recording and reproduction characteristics can be improved by reducing the three patterns of the crosstalk light.

Figure 2:
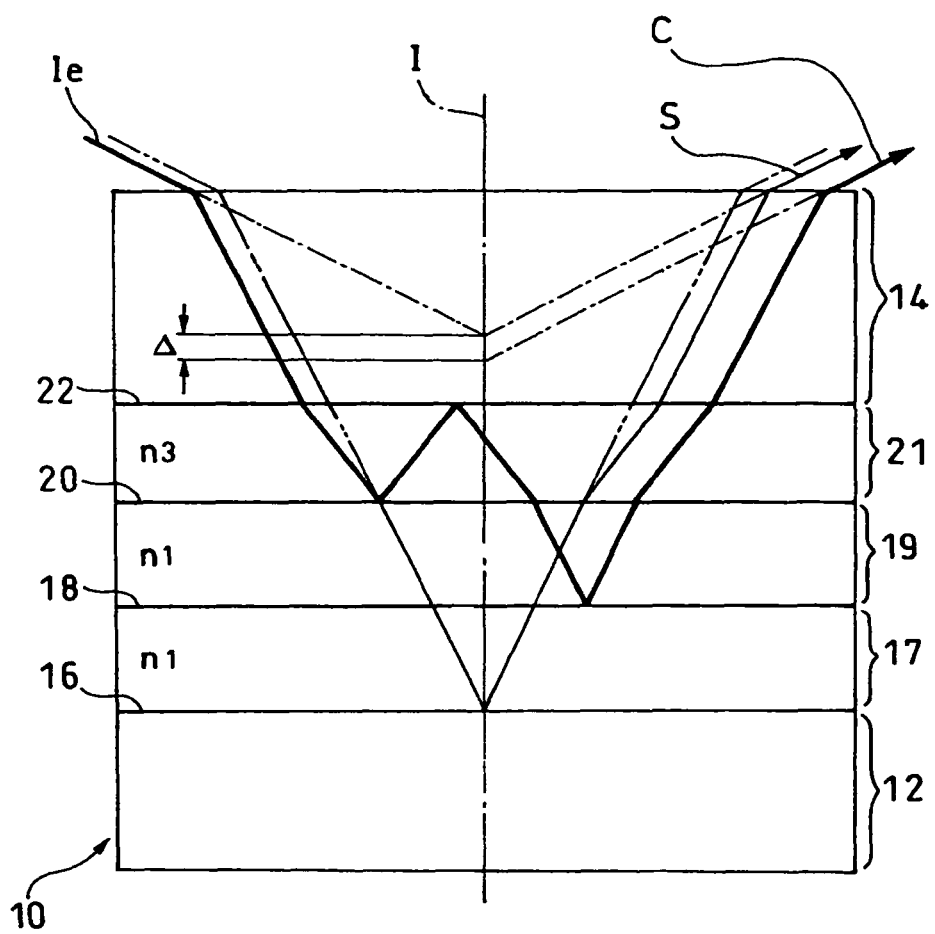
FIG. 2 is an enlarged cross-sectional view schematically showing a part A in FIG. 1.

FIG. 2 is an enlarged view showing a crosstalk light pattern that is the same as that shown in FIG. 11A. The operation mechanism for reducing the effect of the confocal crosstalk light is described in further detail with reference to FIG. 2.

In FIG. 2, one of a number of incident light beams, that corresponds to an optical axis of the incident light beams, is represented as incident light I, and an edge of a beam spot in a diameter direction of the incident light I is represented as Ie. Moreover, as for crosstalk light C and signal light S, light beams corresponding to edges of beam spots of the crosstalk light C and the signal light S in the diameter direction are shown in FIG. 2, respectively.

In FIG. 2, a light path of light that is reflected by the L2 layer 20 and the L3 layer 22 and then reaches the L1 layer 18, as well as a light path of that light until that light exits to the outside of the optical recording medium 10 after being reflected by the L1 layer 18, are shown with bold line in order to facilitate the understanding.

As shown in FIG. 2, the incident light I passes through the cover layer 14, the L3 layer 22, the L2 layer 20, and the L1 layer 18, and the third to first spacer layers 21, 19, 17 between the L3 to L1 layers, and then reaches the L0 layer 16. The incident light I is then reflected by the L0 layer 16. This reflected light exits from the recording medium 10 as signal light S. That light is refracted twice due to a difference of refractive indices before exiting to the outside of the cover layer 14. That is, that light is refracted when entering from the third spacer layer 21 to the second spacer layer 19 and when entering from the second spacer layer 19 to the third spacer layer 21.

A light component of the incident light I is reflected by the L2 layer 20 and the L3 layer 22 and then reaches the L1 layer 18. This light component is reflected by the L1 layer 18 and exits as crosstalk light C, as shown with bold line in FIG. 2. The crosstalk light C is refracted twice like the signal light S. That is, the crosstalk light C is refracted when entering from the third spacer layer 21 to the second spacer layer 19 and is also refracted when entering from the second spacer layer 19 to the third spacer layer 21 after being reflected by the L1 layer 18. However, the crosstalk light C travels on a different light path from that of the signal light S, thereafter exiting from the cover layer 14.

The crosstalk light C and the signal light S behave as a whole as spherical waves emitted from different point light sources, respectively, as shown in FIG. 2.

Positions of the point light sources are an intersection of an extension line of an optical axis of the crosstalk light C at its edge toward the inside of the optical recording medium 10 and the central optical axis of the incident light I and an intersection of an extension line of an optical axis of the signal light S at its edge toward the inside of the optical recording medium 10 and the central optical axis of the incident light I, as shown in FIG. 2. A distance between those positions is Δ.

Figure 3:
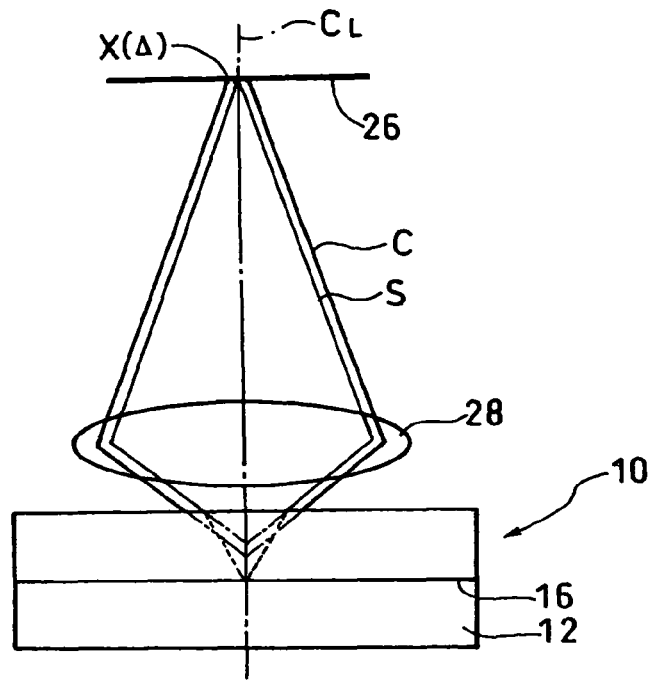
FIG. 3 is a cross-sectional view schematically showing a state where signal light and crosstalk light that exit from the optical recording medium of the first exemplary embodiment reach a light receiving element.

Next, deviation between the signal light S and the crosstalk light C on a light receiving element 26 of an optical head (the entire optical head is not shown in the drawings) is described with reference to FIG. 3. When this deviation is sufficiently large, the effect of the crosstalk light, especially the effect of the confocal crosstalk light is eliminated.

As shown in FIG. 2, the incident light I focused on the L0 layer 16 is reflected by the L0 layer 16 so as to turn into the signal light S. The signal light S is focused on the light receiving element 26 by an objective lens 28, as shown in FIG. 3. On the other hand, the crosstalk light C (its optical axis) behaves as a light beam emitting from a point on a central optical axis $C_L$ of the light receiving element 26 that is away from the focused point of the signal light S by Δ. Thus, the crosstalk light C reaches a position on the light receiving element 26 that is shifted from the focused position of the signal light by X in a direction perpendicular to the central optical axis $C_L$. Therefore, when the shift amount X is enough, the effect of the crosstalk light is eliminated, as described before.

In other words, the first exemplary embodiment changes the confocal crosstalk to be non-confocal, i.e., provides the shift Δ, thereby reducing the effect of the crosstalk to a level of an effect of non-confocal crosstalk.

Figure 4:
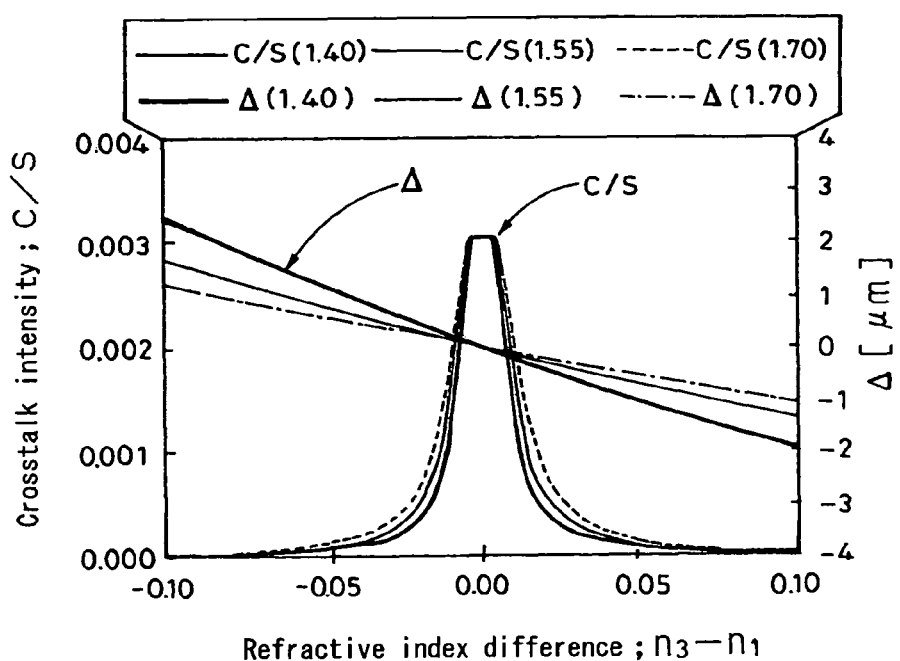
FIG. 4 is a diagram showing a relationship between a refractive index difference between light transmitting spacer layers, a change of a refractive index, crosstalk intensity, and a shift amount of an apparent light emitting point within the optical recording medium in the first exemplary embodiment.

FIG. 4 shows a calculation result of a ratio of crosstalk to signal light (C/S ratio) in the case where the spacer layers have a refractive index difference (e.g., $n_3-n_1$) and the refractive index $n_3$ is changed. Please note that the first exemplary embodiment is shown in a left half of FIG. 4 because $n_3-n_1<0$.

C/S ratio is now described. Signal light and crosstalk light exit to the outside of a medium with their unique reflection intensities, respectively. The reflection intensity is determined by a reflectance and a transmittance of a surface of the medium and a recording layer. The light exiting from the medium passes through various optical parts, and is then incident on a light receiving element while being converged. The light receiving element detects the light incident thereon by its light receiving surface. Since the light receiving element includes the light receiving surface having a finite size, it only detects a part of the signal light or crosstalk light around an optical axis, not all part of the signal light or crosstalk light.

Thus, outgoing intensities of the signal light and the crosstalk light and intensity distributions thereof on the light receiving surface are calculated, and integral of each intensity distribution with respect to a shape of the light receiving surface is calculated. That integral is called as a "detection intensity." Moreover, the detection intensities for all existing crosstalk patterns are summed up. A ratio of that sum to the detection intensity of the signal light is determined as a "ratio of crosstalk to signal (C/S ratio)." A C/S ratio is a physical amount corresponding to a signal actually detected by an optical pickup and is an important parameter as an index indicating performance of a recording medium or an optical system.

In FIG. 4, a horizontal axis represents a refractive index difference $n_3-n_1$ and a vertical axis represents a crosstalk intensity C/S and Δ (μm) as described before. FIG. 4 shows cases where $n_1=1.40$, 1.55, and 1.70.

As is apparent from FIG. 4, the crosstalk is reduced to about ½ when the refractive index difference is 0.01 in all cases, although the crosstalk is slightly different depending on a value of $n_1$. More specifically, the refractive index difference reducing the crosstalk to 50% of its peak value was 0.009 in the case where $n_1=1.40$, 0.011 in the case where $n_1=1.55$, and 0.013 in the case where $n_1=1.70$.

Moreover, the refractive index difference reducing the crosstalk to 80% of its peak value was 0.006 in the case where $n_1=1.40$, 0.007 in the case where $n_1=1.55$, and 0.008 in the case where $n_1=1.70$.

Therefore, it is found that the effect of reducing the crosstalk can be achieved when the refractive index difference of the spacer layers $|n_3-n_1|$ is 0.006 or more and 0.025 or less.

More specifically, in the case where one of the spacer layers has a refractive index of 1.40, 1.55, or 1.70, the effect of reducing the crosstalk can be achieved when the refractive index difference between that spacer layer and an adjacent spacer layer is 0.006 or more, 0.007 or more, or 0.008 or more.

Four patterns shown in FIG. 2 and FIGS. 5A to 5C are all patterns of the confocal crosstalk light in the four-layer optical recording medium.

In the first exemplary embodiment, only the pattern of the confocal crosstalk light that is the same as that shown in FIG. 11A is analyzed. As for the pattern shown in FIG. 5A corresponding to FIG. 11B, it is expected from geometric consideration that the shift amount X becomes larger according to the exemplary embodiment of the present invention. Therefore, analysis is not necessary and description thereof is omitted.

As for the pattern of the confocal crosstalk light corresponding to FIG. 11C, the signal light and the crosstalk light eventually travel the same light path, as shown in FIG. 5B. However, the effect of the total crosstalk light can be reduced by reducing other confocal crosstalk light.

FIG. 5C shows another pattern of the confocal crosstalk light in the four-layer optical recording medium. As for the pattern of FIG. 5C, it is also expected that the shift amount X becomes larger, as compared with the first exemplary embodiment. Therefore, description thereof is omitted.

Figure 6:
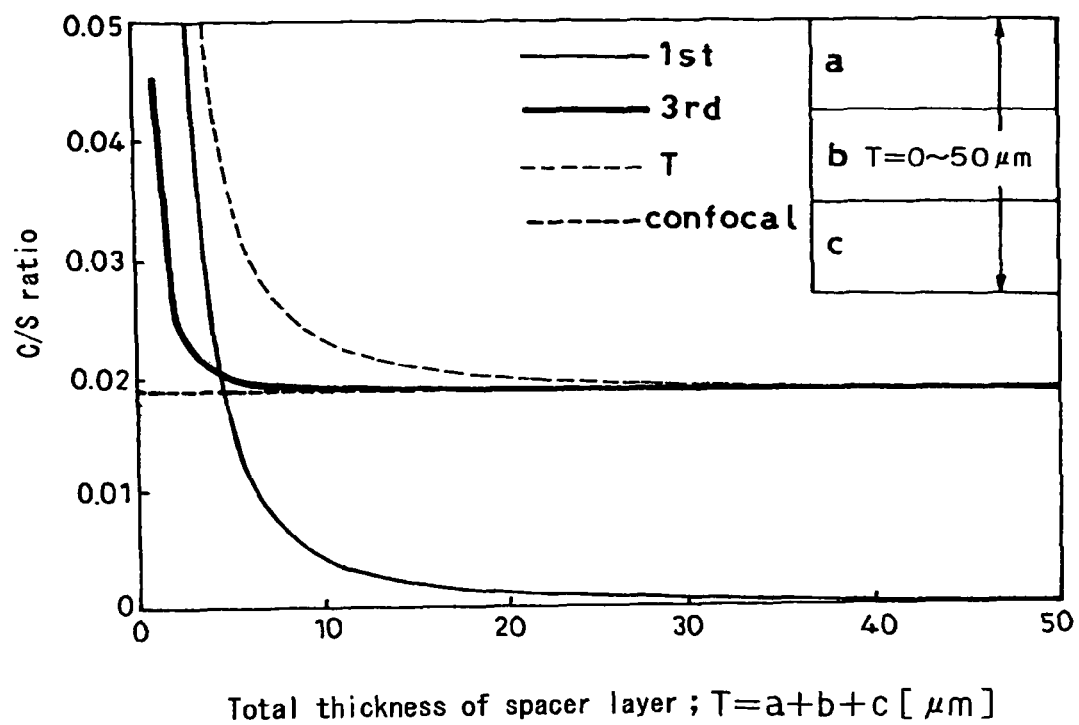
FIG. 6 is a diagram showing a relationship between a thickness of the light transmitting spacer layers and the crosstalk intensity in a four-layer optical recording medium that is similar to that of the first exemplary embodiment for each of first-order crosstalk, third-order crosstalk, confocal crosstalk, and total crosstalk.

FIG. 6 shows a calculation result of a total C/S ratio that was performed by taking all contribution of the first and third-order crosstalk into consideration. In this calculation, it was assumed that the distances between the recording layers (i.e., the thicknesses of three spacer layers) were the same and a total thickness of three spacer layers was changed from 0 to 50 μm.

When the total thickness of the spacer layers is 5 μm or less, contribution of the first-order crosstalk is dominant, as is apparent from FIG. 6. However, when the total thickness of the spacer layers is more than 5 μm, contribution of the third-order crosstalk is dominant and almost all of that contribution is confocal crosstalk. Since an actual four-layer optical recording medium usually has spacer layers having a total thickness of about 50 μm, almost all of the effect of the crosstalk is the effect of the confocal third-order crosstalk.

Table 1 shows the contribution of the third-order crosstalk for every pattern of the crosstalk. In Table 1, it was assumed that the thicknesses of the spacer layers were a, b, and c, respectively, a, b, and c were 16.67 μm, and sum of a, b, and c was 50 μm. Moreover, a pattern of the crosstalk is represented by an order of recording layers that cause reflection. For example, a pattern in which light is reflected by the L1 layer, the L3 layer, and the L2 layer in that order is represented by R132.

TABLE 1

| a = b = c = 16.67 μm | |
|---|---|
| | C/S |
| 1st | 0.000163 |
| 3rd | 0.018844 |
| R231 | 0.003624 |
| R132 | 0.003624 |
| R121 | 0.011584 |
| Total | 0.019007 |

In the first exemplary embodiment, although Pattern R121 that has the largest contribution to the crosstalk remains as confocal crosstalk, the other patterns of the confocal crosstalk can be reduced.

A second exemplary embodiment of the present invention shown in FIGS. 7A to 7D is now described.

In an optical recording medium 30 of the second exemplary embodiment, a refractive index of a first spacer layer 31 and a third spacer layer 33 is set to $n_1$ and a refractive index of a second spacer layer 32 is set to $n_3$ ($n_3 < n_1$).

Figure 7:
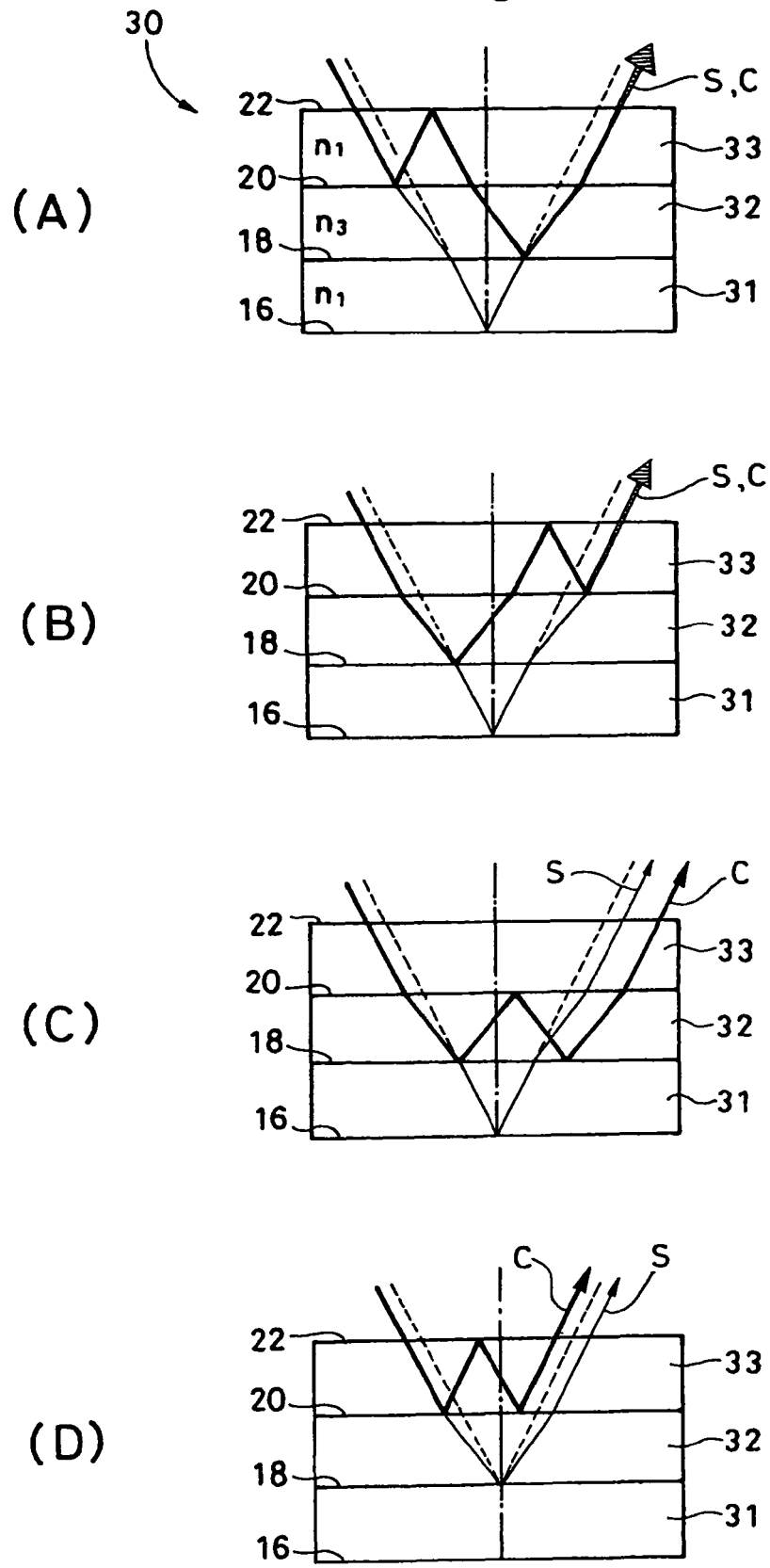
FIGS. 7A, 7B, 7C, and 7D are cross-sectional views schematically showing relationships between signal light and crosstalk light in an optical recording medium according to a second exemplary embodiment of the present invention.

In the optical recording medium 30 of the second exemplary embodiment, patterns of FIGS. 7A and 7B remain as confocal crosstalk. However, when the contribution ratio in Table 1 is considered, the pattern of FIG. 7A representing Pattern R231 and the pattern of FIG. 7B representing Pattern R132 in Table 1 have smaller contribution ratios of the crosstalk, as compared with the pattern of FIG. 7C representing Pattern R121. Thus, the second exemplary embodiment is more preferable than the first exemplary embodiment.

An optical recording medium 40 of a third exemplary embodiment of the present invention shown in FIGS. 8A to 8D is now described.

In the optical recording medium 40, a refractive index of a first spacer layer 41 is set to $n_3$ and a refractive index of a second spacer layer 42 and a third spacer layer 43 is set to $n_1$ ($n_1 > n_3$).

Figure 8:
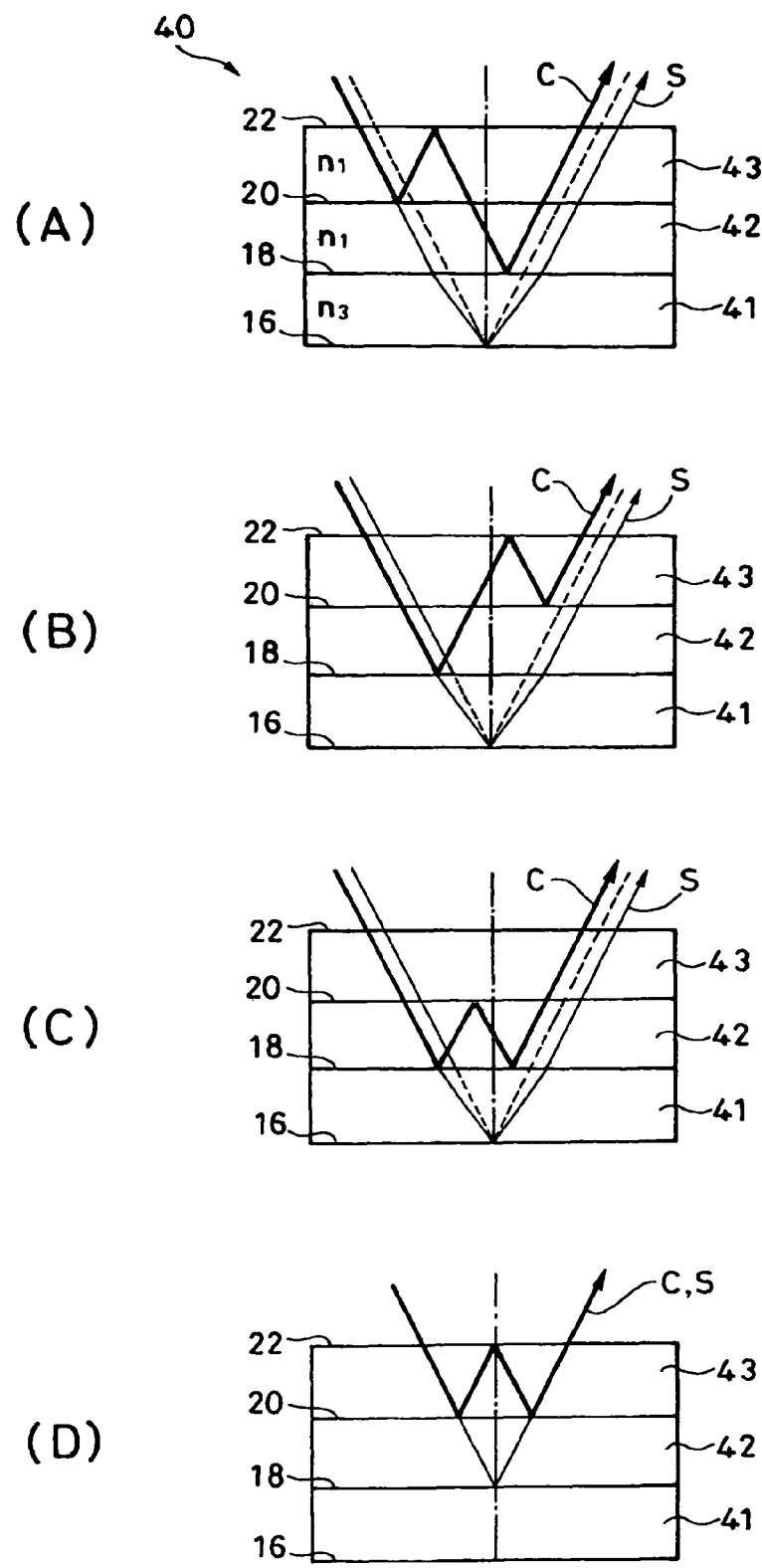
FIGS. 8A, 8B, 8C, and 8D are cross-sectional views schematically showing relationships between signal light and crosstalk light in an optical recording medium according to a third exemplary embodiment of the present invention.
Figure 9:
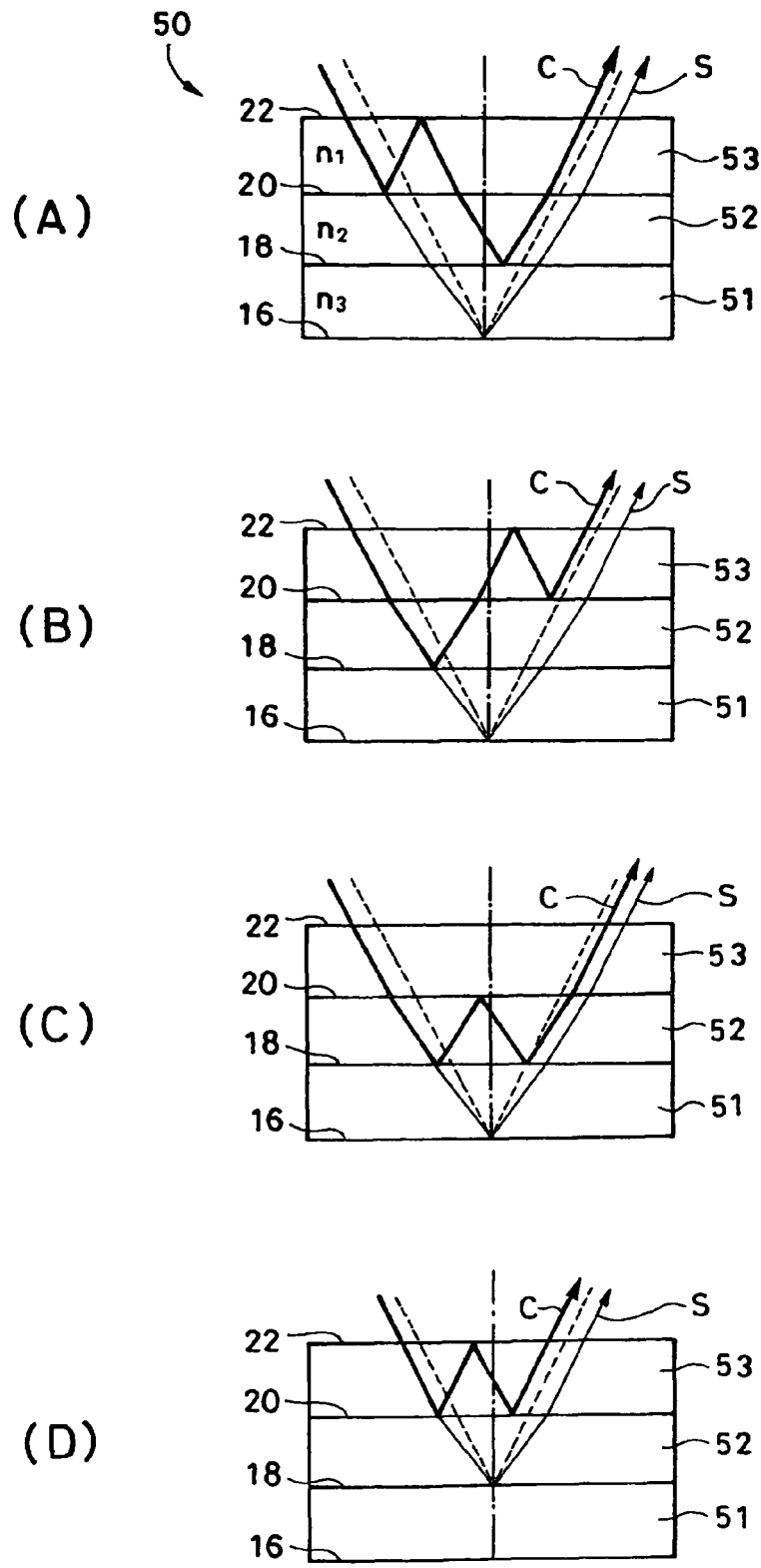
FIGS. 9A, 9B, 9C, and 9D are cross-sectional views schematically showing relationships between signal light and crosstalk light in an optical recording medium according to a fourth exemplary embodiment of the present invention.
Figure 10:
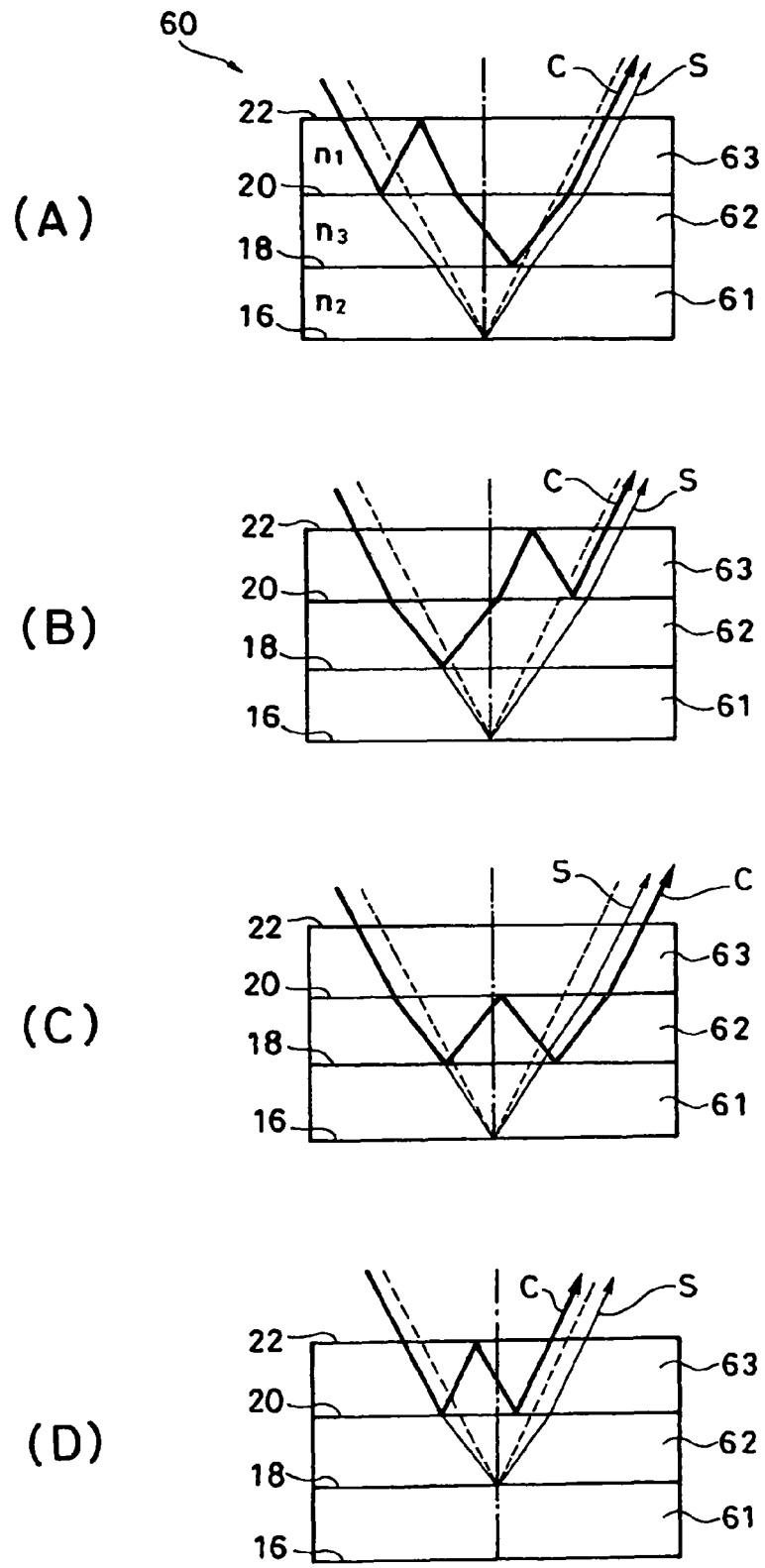
FIGS. 10A, 10B, 10C, and 10D are cross-sectional views schematically showing relationships between signal light and crosstalk light in an optical recording medium according to a fifth exemplary embodiment of the present invention.

As shown in FIGS. 8A to 8C, all patterns of the confocal crosstalk during reproduction of the L0 layer 16 can be made non-confocal. However, as shown in FIG. 8D, the confocal crosstalk remains in case of reproducing the L1 layer 18. On the other hand, the other patterns of the confocal crosstalk are reduced. Thus, the total crosstalk can be reduced.

When the third exemplary embodiment is compared with the first exemplary embodiment, the third exemplary embodiment is considered to be more preferable than the first exemplary embodiment because of a fact that a recording layer closer to a light-incident surface of an optical recording medium generally has better signal quality.

An optical recording medium 50 of a fourth exemplary embodiment of the present invention shown in FIGS. 9A to 9D is now described.

In the optical recording medium 50, a refractive index of a third spacer layer 53 is set to $n_1$, a refractive index of a second spacer layer 52 is set to $n_2$, and a refractive index of a first spacer layer 51 is set to $n_3$, where $n_1 > n_2 > n_3$.

Please note that a refractive index difference between $n_1$, $n_2$, and $n_3$, i.e., $n_1 - n_2$ and $n_2 - n_3$ are set to 0.006 or more and 0.025 or less.

Moreover, when one of the first to third spacer layers 51 to 53 is 1.40, 1.55, or 1.70, a refractive index difference between that spacer layer and an adjacent space layer is set to 0.006 or more, 0.007 or more, or 0.008 or more.

As shown in FIGS. 9A to 9D, all patterns of the confocal crosstalk during reproduction of the four-layer optical recording medium can be made non-confocal in the optical recording medium 50 of the fourth exemplary embodiment. On the other hand, the manufacturing cost increases because the refractive index of the material for the light transmitting spacer layer is changed for every spacer layer. However, to use a plurality of materials for the light transmitting spacer layers does not largely increase the cost in a mass-production stage.

An optical recording medium 60 of a fifth exemplary embodiment of the present invention shown in FIGS. 10A to 10D is now described.

In the optical recording medium 60, a refractive index of a third spacer layer 63 is set to $n_1$, a refractive index of a second spacer layer 62 is set to $n_3$, and a refractive index of a first spacer layer 61 is set to $n_2$, where $n_1 > n_2 > n_3$.

Please note that the refractive index difference between $n_1$, $n_2$, and $n_3$, i.e., each of $n_1 - n_2$ and $n_2 - n_3$ is set to 0.006 or more and 0.025 or less.

In the fifth exemplary embodiment, all the confocal crosstalk during reproduction of the four-layer optical recording medium can be also made non-confocal.

The optical recording media of the above exemplary embodiments have four recording layers. However, the present invention is not limited thereto. The present invention can be generally applied to an optical recording medium having at least three recording layers.

What is claimed is:

1. An optical recording medium comprising:
   a substrate;
   a light transmitting cover layer;
   at least four recording layers including an L0 layer, an L1 layer, an L2 layer, and an L3 layer formed between the substrate and the light transmitting cover layer in that order from the substrate; and
   a plurality of light transmitting spacer layers respectively formed between the recording layers, wherein
   at least one of the light transmitting spacer layers has a refractive index different from that of another light transmitting spacer layer at a single wavelength of an incident light,
   a refractive index difference between the light transmitting spacer layers is 0.006 or more and 0.025 or less, the recording layers include the L0 layer, the L1 layer, the L2 layer, and an L3 layer in that order from the substrate, the light transmitting spacer layers include a first light transmitting spacer layer formed between the L0 layer and the L1 layer, a second light transmitting spacer layer formed between the L1 layer and the L2 layer, and a third light transmitting spacer layer formed between the L2 layer and L3 layer, and the first light transmitting spacer layer, the second light transmitting spacer layer, and the third light transmitting spacer layer have refractive index in any one of combinations $n_1:n_1:n_3$, $n_3:n_1:n_1$, and $n_2:n_3:n_1$, where $n_1>n_2>n_3$.

* * * * *